UNITED STATES PATENT OFFICE.

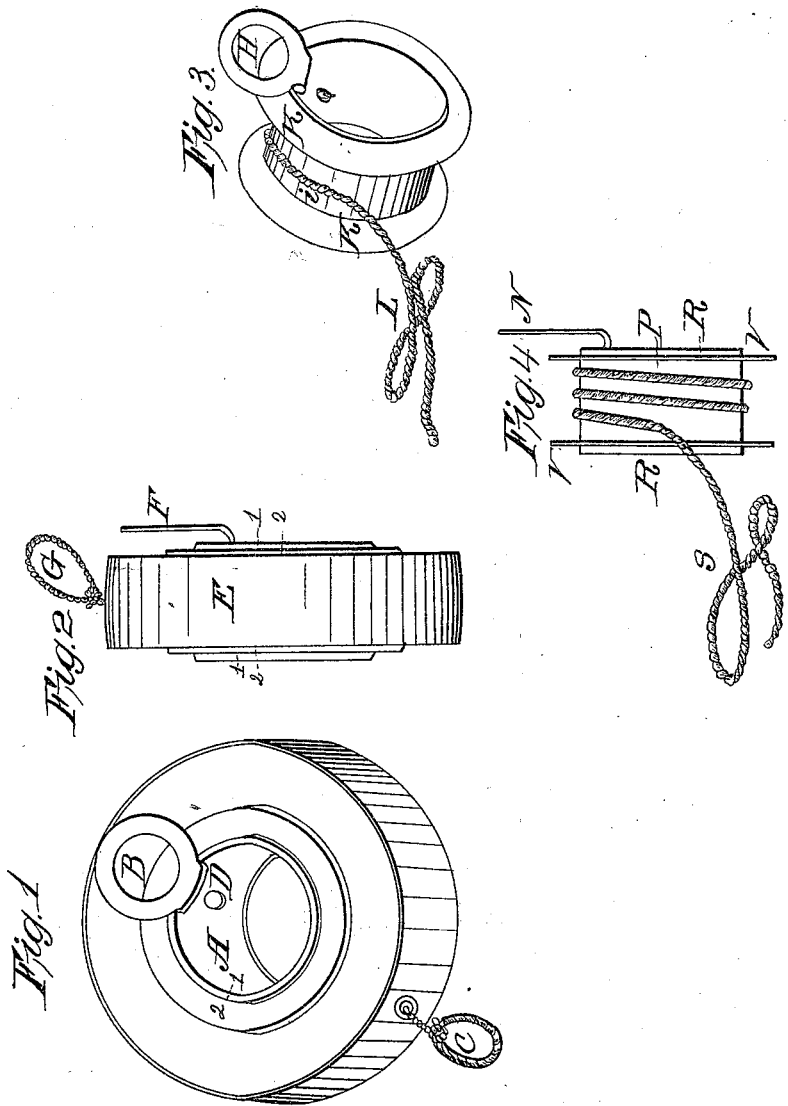

GERARD SICKELS, OF MIDDLETOWN, CONNECTICUT.

REEL FOR CHALK-LINES.

Specification of Letters Patent No. 1,451, dated December 31, 1839.

*To all whom it may concern:*

Be it known that I, GERARD SICKELS, of Middletown, in the county of Middlesex and State of Connecticut, have invented a new and useful box, called a "Reel-Box," in which to wind tapes and lines, which is herein described.

Construct a round box or case 2½ inches in diameter ¾ of an inch thick, having an opening through the center 1¼ inches in diameter; make the sides of said box of tin. plate, the rim of block tin, cast and turned; let the edges of the plates and rim be fitted together in the usual manner; place in said box a tin-plate hoop with flanges thereon ¼ inch wide; set the hoop so that it will revolve in channels, indentations, or grooves formed on the inside of the box, around (and a little larger than) the opening, with a crank attached to the hoop to turn it by; let the flanges run in another groove or recess of larger circle (but not so deep) as the first; pass the line through a hole in the rim and the end of said line through another hole in the hoop or reel; tie a knot in said end so that it will not draw through the hole; wind the line upon the reel in the box, by turning the crank. Said box is more in detail and further represented by the accompanying drawings.

Figure 1, is a side view. A, the hoop or reel; B, crank or piece of tin plate serving as a crank with a hole in it, into which to introduce a finger for the convenience of turning; C, line; D, knot in the end of line; 1, groove (or part raised by groove) for reel; 2, recess for flange.

Fig. 2 is a second view of said box. E, rim; F, crank; G, line; 1, groove for reel; 2, recess for flange.

Fig. 3 is a view of the heel. H, crank; I, reel; K K, flanges; L, line.

Fig. 4 is a second view of said reel. N, crank; P, reel; R, R, part of reel running in groove 1; S, line; V, V, flanges.

What I claim as my invention and desire to secure by Letters Patent is—

The mode herein described of constructing a reel without a shaft, revolving within a case.

Dated at Middletown, the 5th day of August, A. D. 1839.

GERARD SICKELS.

Witnesses:
JOSEPH GLEASON,
S. W. GRISWOLD.